United States Patent [19]

Andrews et al.

[11] Patent Number: 5,602,848
[45] Date of Patent: Feb. 11, 1997

[54] MULTI-MODE TDM INTERFACE CIRCUIT

[75] Inventors: Lawrence P. Andrews, Boca Raton, Fla.; Gordon T. Davis, Raleigh; Lee H. House, Durham, both of N.C.; Baiju D. Mandalia, Boca Raton, Fla.; Laurence V. Marks, Raleigh, N.C.; William R. Robinson, Jr., West Palm Beach; John C. Sinibaldi, Pompano Beach, both of Fla.

[73] Assignee: International Business Machines Corporation, Armonk, N.Y.

[21] Appl. No.: 460,951

[22] Filed: Jun. 5, 1995

[51] Int. Cl.[6] .................................................. H04J 3/12
[52] U.S. Cl. ........................................................ 370/465
[58] Field of Search ........................ 370/79, 85.1, 85.6, 370/85.9, 85.7, 85.11, 112; 340/825.22, 825.06, 825.5, 825.51, 825.52; 395/250, 275, 400, 425; 364/131, 134

[56] References Cited

U.S. PATENT DOCUMENTS

| | | | |
|---|---|---|---|
| 4,736,362 | 4/1988 | Clark et al. | 370/58 |
| 4,792,970 | 12/1988 | Molnar | 379/284 |
| 4,868,784 | 9/1989 | Marshall et al. | 364/900 |
| 4,965,793 | 10/1990 | Polzin et al. | 370/85.9 |
| 5,237,567 | 8/1993 | Nay et al. | 370/85.1 |
| 5,237,572 | 8/1993 | Badaoui et al. | 370/110.1 |
| 5,311,517 | 5/1994 | Senoo | 370/95.1 |
| 5,335,326 | 8/1994 | Nguyen et al. | 395/250 |
| 5,339,307 | 8/1994 | Curtis | 370/85.9 |
| 5,339,312 | 8/1994 | Sawyer et al. | 370/85.1 |
| 5,349,640 | 9/1994 | Dunn | 370/85.1 |
| 5,371,736 | 12/1994 | Evan | 370/79 |
| 5,379,298 | 1/1995 | Saiki et al. | 370/79 |
| 5,408,501 | 4/1995 | Cornaby | 370/85.9 |

Primary Examiner—Benedict V. Safourek
Assistant Examiner—Ricky Q. Ngo
Attorney, Agent, or Firm—Joscelyn G. Cockburn; George E. Clark

[57] ABSTRACT

A multi-mode time division multiplexing (TDM) interface circuit for interfacing between a serial data port and a data buffer is provided. The TDM interface circuit contains a transmitter and a receiver section. The circuit is programmable to operate in a variety of modes and is capable of supporting various multi-channel TDM interfaces as well as single channel analog interfaces. The circuit is programmable by writing a control word to a control register. In operation the circuit receives a frame synchronization signal, a gated bit clock signal, and a bit clock signal from the circuit with which it is interfacing on the serial data port. A base address input to a base address register provides up to 9 of the most significant bits of a data buffer address. A 12-bit counter is used to generate the remaining (least significant) bits of the data buffer address according to the control word in the control register.

9 Claims, 8 Drawing Sheets

FIG. 4A

| CABN-CAB03 (HEX) | 01 | 02 | 02 | 02 | 02 | 02 | 02 | 02 | 02 | 02 | 03 | 03 |
|---|---|---|---|---|---|---|---|---|---|---|---|---|
| CAB03 | O | O | — | — | X | X | X | X | X | X | O | — |
| CAB02 | O | — | O | X | X | X | X | X | X | X | O | O |
| CAB01 | O | O | O | O | X | X | X | X | X | X | O | — |

← 1 Frame / 12 Time Slots →

FIG. 4B

| CABN-CAB05 (HEX) | 01 | 02 | 02 | 02 | 02 | 02 | 02 | 02 | 02 | 02 | 03 | 03 |
|---|---|---|---|---|---|---|---|---|---|---|---|---|
| CAB04 | — | O | O | O | O | O | — | — | — | — | O | — |
| CAB03 | — | O | O | — | — | — | O | O | O | O | O | O |
| CAB02 | — | O | — | O | — | O | — | O | — | O | O | O |
| CAB01 | — | O | O | O | O | O | O | O | O | O | O | — |

← 1 Frame / 12 Time Slots →

M0
0 = Fat Pipe
1 = Channelized

M1
0 = do not skip
1 = skip disabled slots

5,602,848

MULTI-MODE TDM INTERFACE CIRCUIT

BACKGROUND OF THE INVENTION

1. Field of the Invention

This invention relates to interface circuitry and, more particularly, to a multi-mode time division multiplexing interface circuit.

2. History of the Prior Art

Digital Signal Processors (DSPs) have been developed to support analog telephony applications. Typically these DSPs include one or more serial data interface ports with the capability to support one or more analog Coder-Decoder (CODEC) chips such as an Analog Interface Chip (AIC), a Voice-based Audio Processor (VAP), or a Logarithmic Pulse Code Modulation (PCM) CODEC Chip. These CODEC chips provide a single channel analog interface and therefore the design of the DSP serial data ports is oriented toward supporting a single channel.

As telephony techniques and technology have become increasingly sophisticated, a need has arisen to apply DSPs to telephony applications in a multi-channel environment. A typical multi-channel environment uses time division multiplexed (TDM) channels, with different users each being assigned a time slot or set of slots of a single channel on which user data is transmitted and received.

In order to use a DSP having data interfaces designed for single channel analog applications in a multi-channel TDM environment, it is necessary to design fixed hardware buffer structures for each different TDM application. If the fixed hardware buffer structure specific to a certain TDM application is designed into a DSP, the DSP does not allow the flexibility of using the DSP in a single channel analog environment. An added disadvantage is that once fixed hardware is designed for a specific TDM application, it cannot be easily modified for use in other TDM applications.

It would provide an advantage then to have a DSP interface circuitry that is configurable and programmable to support use of a DSP in differing telephony applications. It would be particularly advantageous if the interface circuitry is capable of supporting various multi-channel TDM applications and, also was capable of supporting single channel interfaces of analog telephony devices.

SUMMARY OF THE INVENTION

The apparatus of the present invention provides a TDM interface circuit capable of supporting various multi-channel TDM telephony applications as well as being capable of supporting single channel interfaces of analog devices.

The TDM interface is programmable to support a TDM link at up to 2.048 Mbps while maintaining full compatibility to support interfaces with analog interface chips.

The circuit is programmed to operate in differing modes by writing a 7 bit control word to a control register. A frame synchronization signal and a bit clock signal are received from the particular chip with which the TDM interface is connected over the serial data bus. The circuit operates in byte or word mode. A base address is written to a base address register to provide up to 9 of the most significant bits of a data buffer address. A 12-bit counter is used to generate the remaining (least significant) bits of the data buffer address. By setting the control word, up to the 9 most significant bits of the beginning address of the transmit/ receive buffer can be set and the transmit/ receive buffer sizes can be defined anywhere from 32 to 4K words in size. Interleaved buffers may also be selected. This allows interleaved transmit and receive. Modulo 24 count can also be programmed for the five least significant bits of the address.

BRIEF DESCRIPTION OF THE DRAWINGS

FIG. 4A–4D are timing diagrams illustrating address generation for various modes of operation of a TDM interface circuit of FIG. 1.

DETAILED DESCRIPTION

Figure 1:
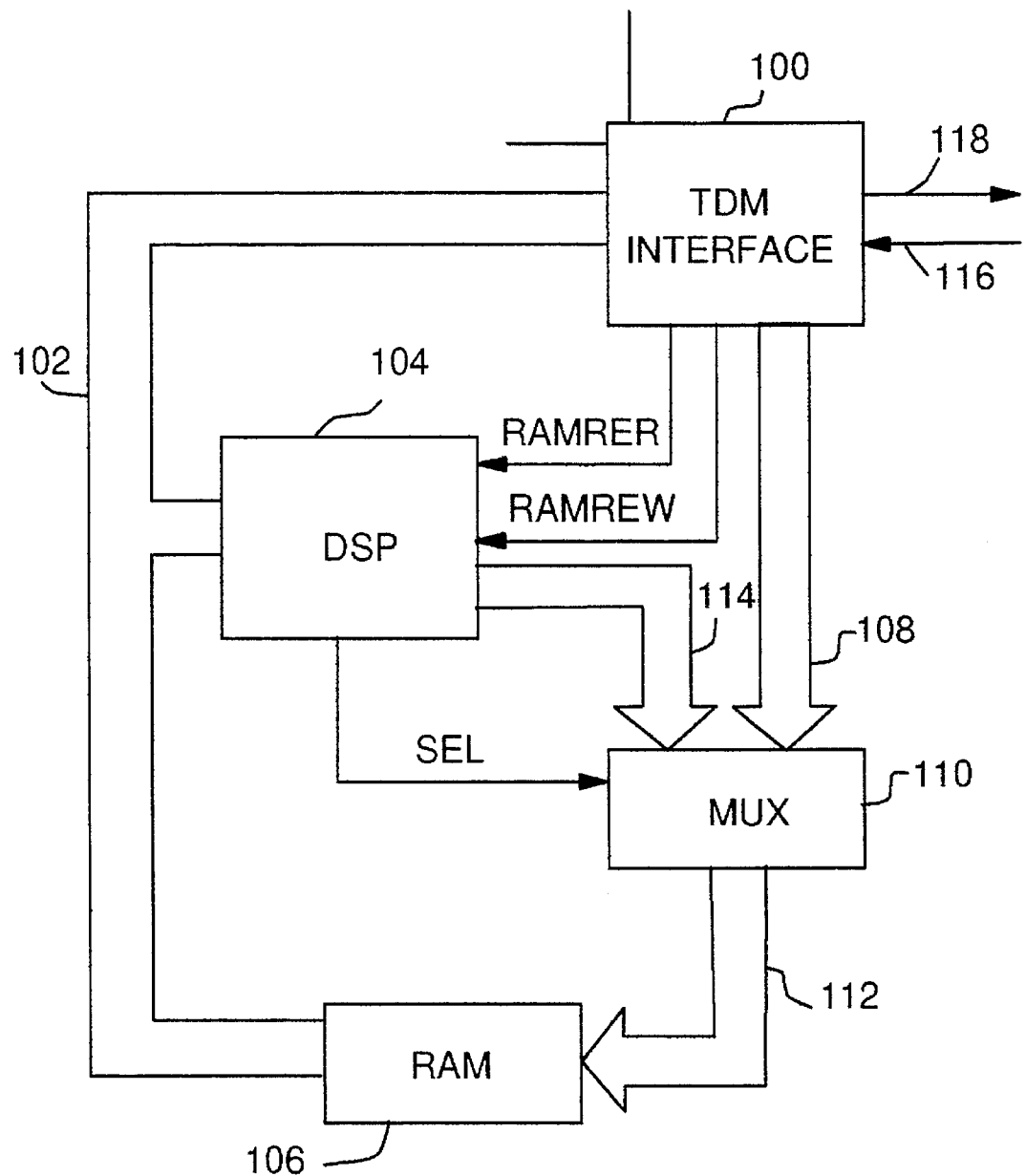
FIG. 1 shows a schematic block diagram of a TDM interface according to the teachings of the present invention implemented in a digital signal processing application.

FIG. 1 is a schematic block diagram showing a TDM interface according to the present invention implemented in a digital signal processing application. The TDM interface 100 operates to receive and transmit data on serial data ports 116 and 118, respectively. The mode of operation of TDM interface 100 in transmitting and receiving is configurable, and depends on programming provided by digital signal processor (DSP) 104. TDM interface 100 receives control data from random access memory (RAM) 106 and DSP 104 over bidirectional data bus (DBUS) 102. TDM interface 100 also may access data stored in RAM 106 for transmit and receive by accessing RAM 106 through address bus 108, Mux 110 and address bus 112, when the SEL input of Mux 110 is set to select address bus 108. DSP 104 selects control data from RAM 106 for input to TDM interface 100 through address bus 114, Mux 110 and address bus 112, when the SEL input of Mux 110 is set to select address bus 114.

The TDM interface 100 is programmable to support a TDM link at up to 2.048 Mbps while maintaining full compatibility to support interfaces with analog interface chips. Port configuration bits accessible by the DSP 104 are used to enable the various TDM functions. Data buffer sizes and locations in RAM may be programmed and data may be optionally transferred one byte at a time into the low byte of the word addressed in RAM. The data may be continuously shifted out serially on both serial data port in 116 and serial data port out 118. Byte alignment is set relative to a frame sync pulse. For transmit the serial data output will be put into the high impedance state during inactive time slots. When programmed for byte mode with a 1.536 MHz reference clock, if the modulo 24 option is not selected, the last time slot will be received into the high byte of the work with the first-time slot byte. When using the 1.536 MHz reference clock, if the modulo 24 option is not selected, then only the first 4 time slots after each frame sync pulse will be transferred to and from PAM. A gated bit clock derived from the bit clock signal is used to drive a byte counter so only the required 4 bytes are counted during each frame. The following parameters are programmable in order to control the data buffer access by the TDM interface:

- Beginning address of transmit/receive buffer (up to 9 most significant bits).
- Receive buffer size ($2^N$; 32 to 4K words).
- Transmit buffer size ($2^N$; 32 to 4K words).
- Set modulo 24 count for LS 5 bits.
- Select odd versus even addresses if interleaved buffers selected.
- Set stride for separate or interleaved transmit and receive.
- Byte or word mode for data transfers to/from data port.

By selecting interleaved buffers with buffer sizes and beginning addresses equal to a particular analog interface chip buffer definition, the TDM interface can duplicate the appearance of analog interface buffers.

Figure 2:
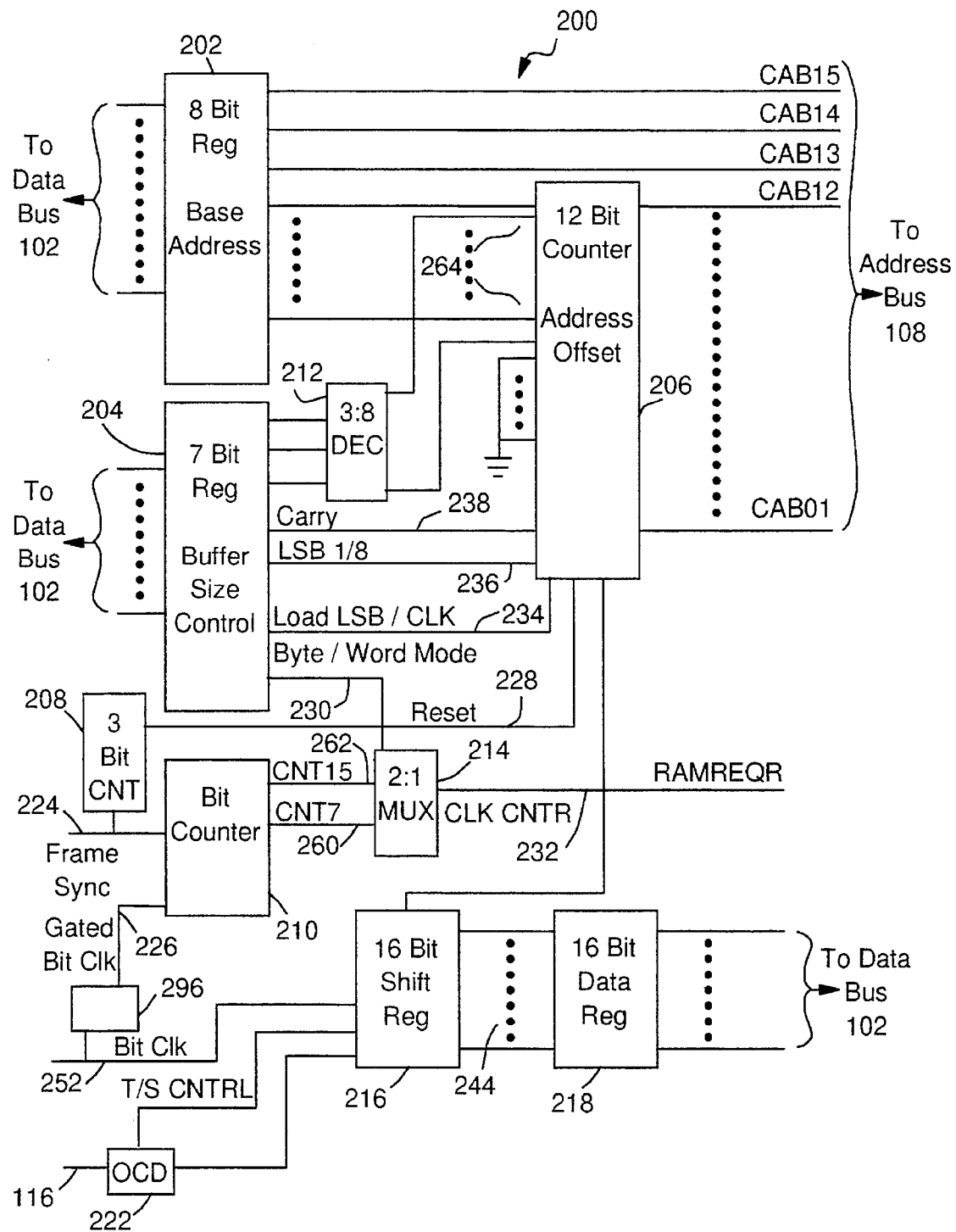
FIG. 2 shows a schematic block diagram of the transmit circuitry of the TDM interface of FIG. 1.

Referring now to FIG. 2, therein is shown a schematic block diagram of the transmit circuitry of TDM interface 100 of FIG. 1. Transmit circuitry 100 comprises an 8-bit base address register 202, a 7-bit buffer size control register 204, a 12-bit address offset counter 206, a 3-bit frame sync counter 208, a bit counter 210, a 3 to 8 decoder 212, a 2 to 1 multiplexer 214, a bit timer 296, a 16-bit shift register 216, and a 16-bit data register 218 and an off-chip driver 222.

In operation TDM interface 100 generates a request for RAM access signal on RAMREQR and 15-bit address at outputs CAB01-CAB15 which is input to RAM 106 through address bus 108, Mux 110 and address bus 112. Least significant address bits CAB01-CAB12 are output from address offset counter 206, which toggles once per output byte or once per word depending on the programmed configuration. Bit counter 210 generates the byte and word clock signals at CNT7 260 and at CNT15 262, respectively, from gated bit clock signal input 226. The gated bit clock signal 226 is derived from the bit clock signal 252 received from the particular interface chip which the TDM interface 100 is interfacing to the DSP. Depending on the mode of operation gated bit clock 226 may be turned off during irrelevant time slots on the TDM interface. This prevents address offset counter 206 from incrementing for these time slots and eliminates the need for buffer space for those time slots. 2 to 1 multiplexer 214 selects a Clock CNTR signal 232 to clock address offset counter 206. Clock CNTR 232 is also used to transfer a word of data from 16-bit data register 218 to 16-bit shift register 216 over parallel data lines 244 for transmission on serial output port 116. The data is clocked by a bit CLK signal 252. The bit CLK 252 signal is received from the particular interface chip which TDM interface 100 is interfacing to the DSP. Clock CNTR 232 is also used to initiate a request for a new word of transmit data from RAM 106 on RAMREQ. After a short arbitration delay, the next data from RAM 106 is transferred by DSP 104 into 16-bit data register 218 over data bus 102. Off-chip drivers (OCD) 222 provides a mechanism for enabling and disabling transfers to output port 220 during inactive transmit channels. When running in BYTE mode, a "0" in the most significant bit position of a word 16-bit shift register 216 will put OCD 222 into the high impedance state, removing the output of 16-bit shift register 216 from serial output port 116. OCD 222 may be included in order to allow other devices access to the output port 116. This feature allows the use of multiple DSP chips to distribute the processing load in complex environments.

3-bit frame sync counter 208 generates a reset signal 228 once for every eight pulses that are detected at frame sync input 224. Pulses received at frame sync input 224 are received from the particular interface chip which the TDM interface 100 is interfacing to the DSP. The least significant 5 bits of address offset counter 206 are reset by reset signal 228 to ensure that buffer addresses remain synchronized with the TDM frame structure. Reset signal 228 is activated only once for every eight frames to ensure that even for small frame sizes the reset will not alter the progression of address offset counter 206 once synchronization to the frame sync signal 224 has been achieved. Frame sync signal 224 also synchronizes bit counter 210 with the TDM frame structure.

Buffer size is determined by the contents of buffer size control register 204 which is loaded from the DSP via data bus 102 using a standard load instruction. The least significant bit of buffer size control register 204 generates byte/word mode signal 230 which controls the selection of Clock CNTR signal 232 via Mux 214 as described above. The next least significant bit of buffer size control register 204 generates load LSB/CLK signal 234 which disables the least significant bit of address offset counter 206 when activated. This has the effect of generating an increment of two each time address offset counter 206 is clocked. This feature is used to interleave transmit and receive buffers in alternate words in the same buffer space. The third least significant bit of buffer size control register 204 generates LSB signal 236 which controls whether odd or even addresses are used when interleaving buffers. The fourth least significant bit of buffer size control register 204 generates carry signal 238 which implements module 24 (or module 12) counting by modifying the carry signal between bits 5 and 6 (4 and 6 for module 12) of address offset counter 206. This feature is used to selectively choose between generating a carry at a count of 23 or a count of 31. To the next most significant bit while clearing the least significance 5 bits.

The remaining 3-bits (3 most significant bits) of buffer size control register 204 are decoded by decoder 212 to select one of eight buffer sizes by disabling one or more high-order bits 264 of address offset counter 206 and forcing a parallel load for the high order bits 264 of address offset counter 206 from base address register 202. The maximum buffer size is realized when all twelve bits are active, resulting in a buffer size of 4096 words (128 per channel for a 32 channel interface). The most significant bits CAB12–CAB15 of the address are controlled by the beginning address parameter contained in base address register 202. Bits in this parameter which overlap the active counter segment of the address will be blocked off and ignored. Base address register 202 is loaded by the DSP 104 from RAM 106 over data bus 102 using the same standard write instruction used to load buffer size control register 204.

Figure 3:
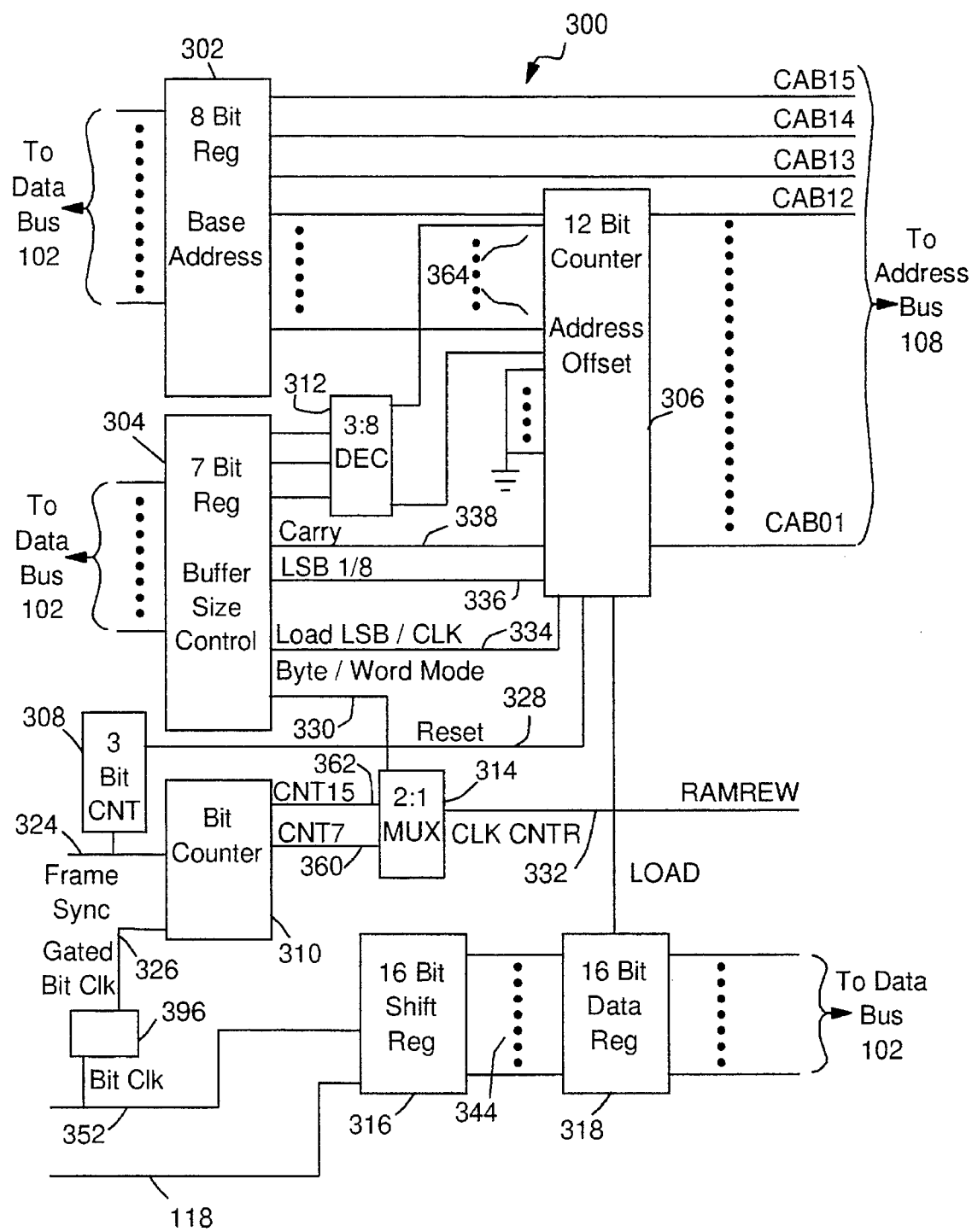
FIG. 3 shows a schematic block diagram of the receive circuitry of the TDM interface of FIG. 1.

Referring now to FIG. 3 therein is shown a schematic block diagram of the receive circuitry of TDM interface 100 of FIG. 1.

The operation of receiver 300 is identical to that of transmitter 200 with the exception that receiver 300 accepts in serial data at serial input port 118. This serial data is input into 16-bit shift register 316, and then loaded into 16-bit data register 318 by CLK CNTR RAMREQ signal 332 which is output to DSP 104 as the RAMREQW signal. The other signals and components of receiver 300 function equivalently to the identically named signals and components of transmitter 200, as described above, to generate the addresses and signals needed for interaction with DSP 104 and RAM 106 in order to move data between serial input port 320 and the correct address in RAM 106.

The TDM interface 100 may be used with such multi-channel digital TDM circuits as a Siemens PEB 2081 or PSB 2186 basic rate Integrated Services Digital Network (ISDN) interface or, a Siemens PEB 2035 2MB primary rate ISDN interface. These TDM circuits operate according to the Siemens IOM-2 bus specifications.

FIGS. 4A–4D are timing diagrams which illustrate data buffer address generation for possible modes of operation of the TDM interface circuit of FIG. 1 when interfacing with the IOM-2 bus.

FIG. 4A illustrates ISDN basic rate interface mode address generation timing with 4 of 12 time slots enabled. The addresses generated in byte mode. This requires a bit clock rate of 1.536 MHz and has a data rate of 768 Kbps. This mode will connect the first 4 time slots of the TDM bus to transmit and receive buffers in RAM. For transmit, each byte to be sent will be read from the low byte of the current buffer location; the high byte must be zeros to enable the time slot. For receive, each time slot will be placed in the low byte of the current buffer location, with the high byte typically set to zero. The first time slot position will be supplemented with additional information in the receive direction. In this case, data from the last time slot will be placed in the high byte, along with data from the first time slot which goes in the low byte. This additional information may be used in an ISDN implementation to deal with collisions on the "S" interface. All four channels share a common buffer in each direction and are placed in the buffer in the order received (or to be transmitted). Sequential accesses to multiple bytes from the same time slot can then be achieved by incrementing a pointer by 8 (byte addressing of word buffers). The pointer will require incrementing by 16 if transmit and receive buffers are interleaved.

FIG. 4B illustrates ISDN basic rate interface mode address generation timing with 12 of 12 time slots enabled. In this case, modulo 24 count must be enabled in the TDM interface 100. This also requires a bit clock rate of 1.536 MHz and has a data rate of 768 Kbps. This mode will connect all 12 time slots of the TDM bus to transmit and receive buffers in RAM. For transmit, each byte to be sent will be read from the low byte of the current buffer location; the high byte must be zeros to enable the time slot. For receive, each time slot will be placed in the low byte of the current buffer location, with the high byte typically set to zero. All 12 time slots share a common buffer in each direction and are placed in the buffer in the order received (or to be transmitted). After the twelfth time slot, four buffer positions are skipped prior to the next buffer location for the first time slot. Sequential accesses to multiple bytes from the same time slot can then be achieved by incrementing a pointer by 32 (byte addressing of word buffers).

Figure 4C:
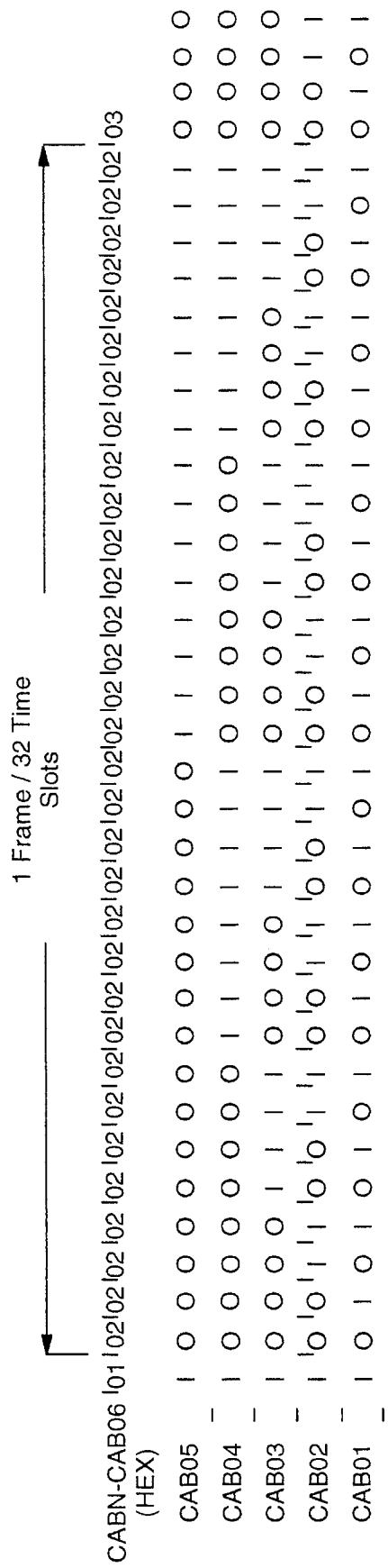

FIG. 4C illustrates address generation timing for ISDN 32 times slot interface modes. In T-1 ISDN primary rate mode 32 of 32 time slots are enabled at a 2,048 MB data rate. The bit clock rate is set to 2,048 MHz for this mode. T-1 ISDN primary mode will connect 24 time slots of a 2,048 MHz TDM bus to transmit and receive buffers in DSP data RAM. For transmit, each byte to be sent will be read from the low byte of the current buffer location; the high byte must be zeros to enable the time slot. For receive, each time slot will be placed in the low byte of the current buffer location, with the high byte typically set to zero. All 24 time slots share a common buffer in each direction and are placed in the buffer in the order received (or to be transmitted). The eight unused time slots are typically connected to the interface as well, but do not convey any data. Alternately, if modulo 12/24 addressing is selected, data transfers to and from these unused time slots are disabled. Sequential accesses to multiple bytes from the same time slot can then be achieved by incrementing a pointer by 64 (byte addressing of word buffers).

Address generation timing for T-1 ISDN primary rate mode is identical to E1 ISDN timing except that in T-1 ISDN address offset counter 206 jumps from 10111B (time slot 24) to 00000B (time slot 31) to skip idle time slots 24 to 31. E-1 ISDN primary mode will connect 32 time slots of a 2.048 MHz TDM bus to transmit and receive buffers in DSP data RAM. For transmit, each byte to be sent will be read from the low byte of the current buffer location; the high byte must be zeros to enable the time slot. For receive, each time slot will be placed in the low byte of the current buffer location, with the high byte typically set to zero. All 32 time slots share a common buffer in each direction and are placed in the buffer in the order received (or to be transmitted). Sequential accesses to multiple bytes from the same time slot can then be achieved by incrementing a pointer by 64 (byte addressing of word buffers).

Figure 4D:
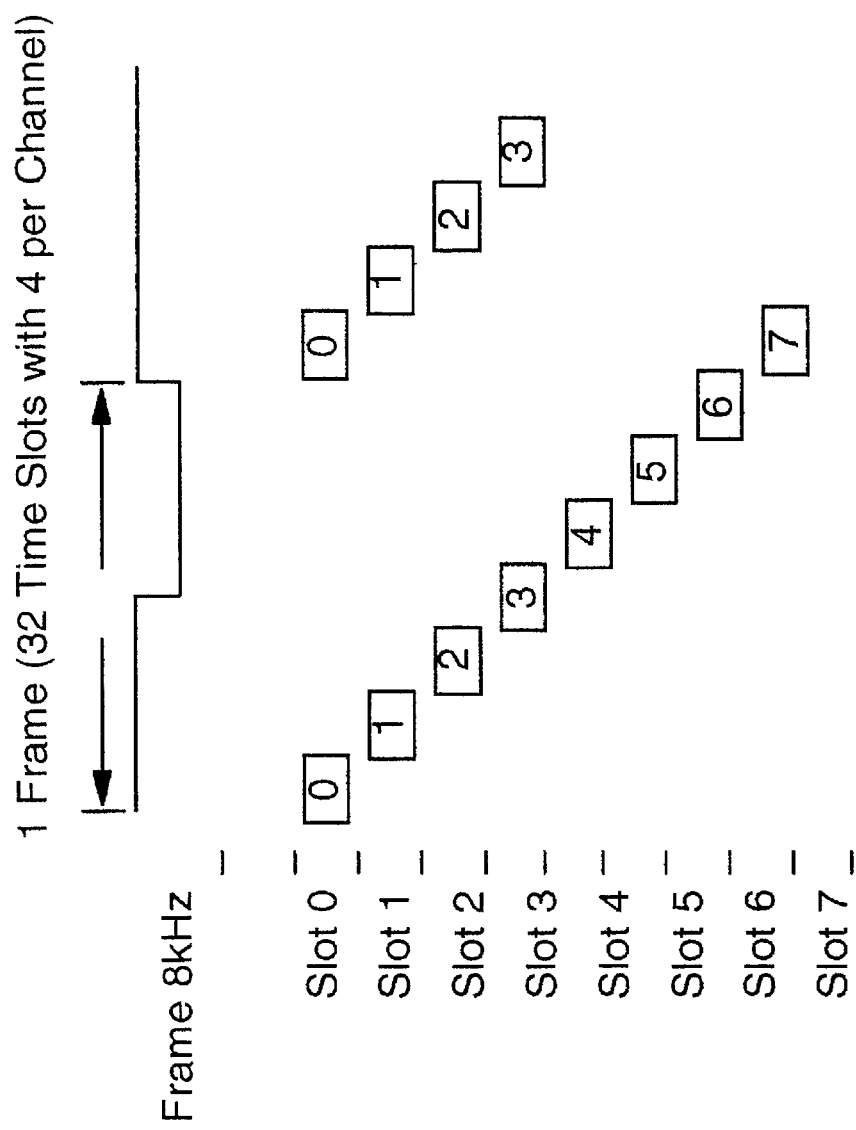

FIG. 4D illustrated multi-port ISDN basic rate interface mode address generation timing. In multi-port ISDN basic interface mode each IOM-2 channel comprises 4 time slots on a 2.048 MB TDM interface. Each IOM channel represents a different ISDN network interface module. The bit clock is set to 1.536 MHz for this mode. Multiport basic mode will connect 32 times slots of a 2.048 MHz TDM bus to transmit and receive buffers in RAM. Each group of four time slots is typically allocated to one ISDN basic rate interface chip or other IOM-2 compatible device. For transmit, each byte to be sent will be read from the low byte of the current buffer location; the high byte must be zeros to enable the time slot. For receive, each time slot will be placed in the low byte of the current buffer location, with the high byte typically set to zero. All 32 time slots share a common buffer in each direction and are placed in the buffer in the order received (or to be transmitted). Sequential accesses to multiple bytes from the same time slot can then be achieved by incrementing a pointer by 64 (byte addressing to word buffers).

The serial I/O is a general purpose serial interface, and does not use a frame synchronization signal. That interface signal is used as an additional external clock to permit independent clocking of transmit and receive. Word mode buffering may be more appropriate for serial I/O to reduce the size of the buffers required. Data will be placed into receive buffers or removed from transmit buffers in the order they pass on the interface. It should be emphasized that transmit and receive are totally asynchronous in this case. This mode supports a continuous stream of bits in both directions.

By adding additional circuitry to the receiver and transmitter shown in FIGS. 2 and 3, additional features that allow separation of individual channel data and fractional mode with non-contiguous channels are available. Three control registers are provided to control the operation of the two new features. These three control registers comprise a mode control register, and two time slot control registers. FIG. 5A shows the data format of channelized/fractional mode register 550. A "0" value in the least significant bit (M0) means default operation. A "1" value in M0 indicates channelized buffering. The base address is bumped by the depth information and each new byte representing a different slot goes into a separate buffer. Address for each data clock=address+transmit depth+receive depth. The based address is set back to original base value at the end of each TDM frame. A "10" value at least significant bits M1, M0 indicates fractional operation. In this mode the active time slots indicated in the two time slot control registers combined into one contiguous fractional buffer to make it look like a single channel of high speed data. The upper byte of this register, bits 8–15 is the max, channel value for the number of slots in the TDM frame.

The circuitry necessary to allow separation of individual channel data and fractional mode will be described with reference to the transmitter circuit of FIG. 2. Identical modifications are also made to the receiver circuit of FIG. 3 to implement these modes.

Figure 5B:
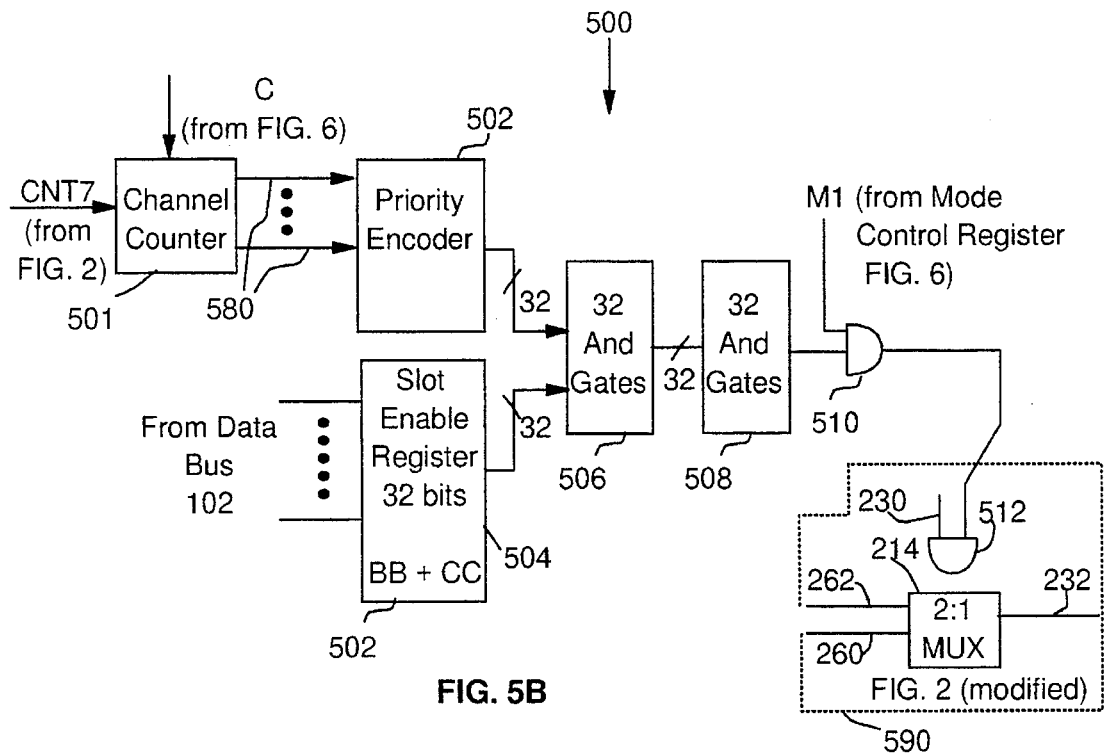
FIG. 5B shows slot enable logic for the channelized/ fractional mode of the invention.
Figure 5A:
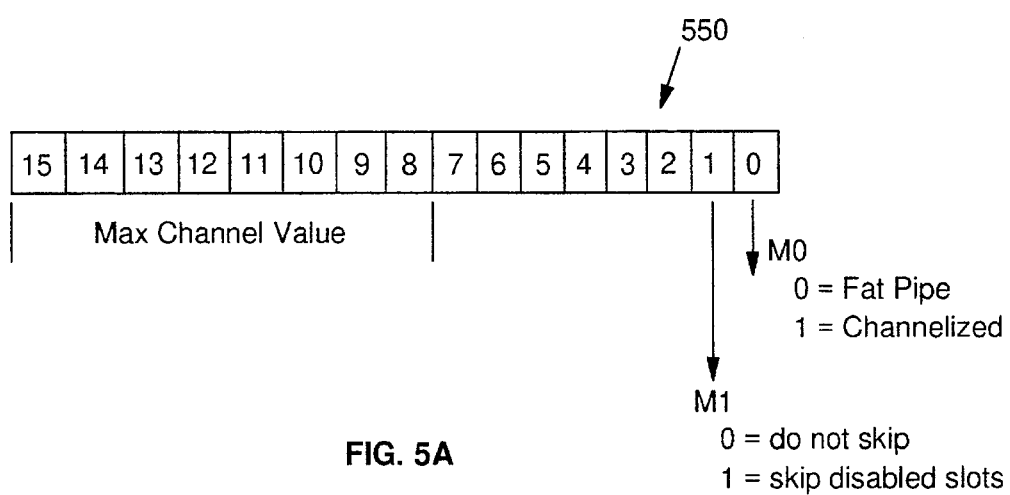
FIG. 5A illustrates the control register data format for a channelized/fractional mode of the invention.

FIG. 5B shows the slot enable logic 500. The signal CNT7 from FIG. 2 clocks the channel counter 501. The reset point C from FIG. 6 resets counter 501 when the channel count reaches the maximum count that is defined in bits 8 to 15 of mode register 524. The 5 bit output 580 of channel counter 501 is input to priority encoder 502. The priority encoder 502 has a 1 output for the active slot of 32 in process and based on the 32 bit register mask created by the 32 and gates 506 and the 32 input and gate 508 and defined by the contents of time slot control registers (BB) and (CC) within register 504, the output A indicates if the byte needs to be gated in the buffer. M1 has been set to 1 for this mode. Time slots 16–31 control register CC, all bits set to 1 in CC indicate an active time slot between 16 and 31. The output A is gated with byte/word mode signal 230 to control clock selection through Mux 214 of FIG. 2 for data latching control. The dotted portion 590 of FIG. 5B shows the modifications necessary to FIG. 2 to implement the change. All the active channels will have contiguous data as clocked by clock CNTR 232 of FIG. 2.

Figure 6:
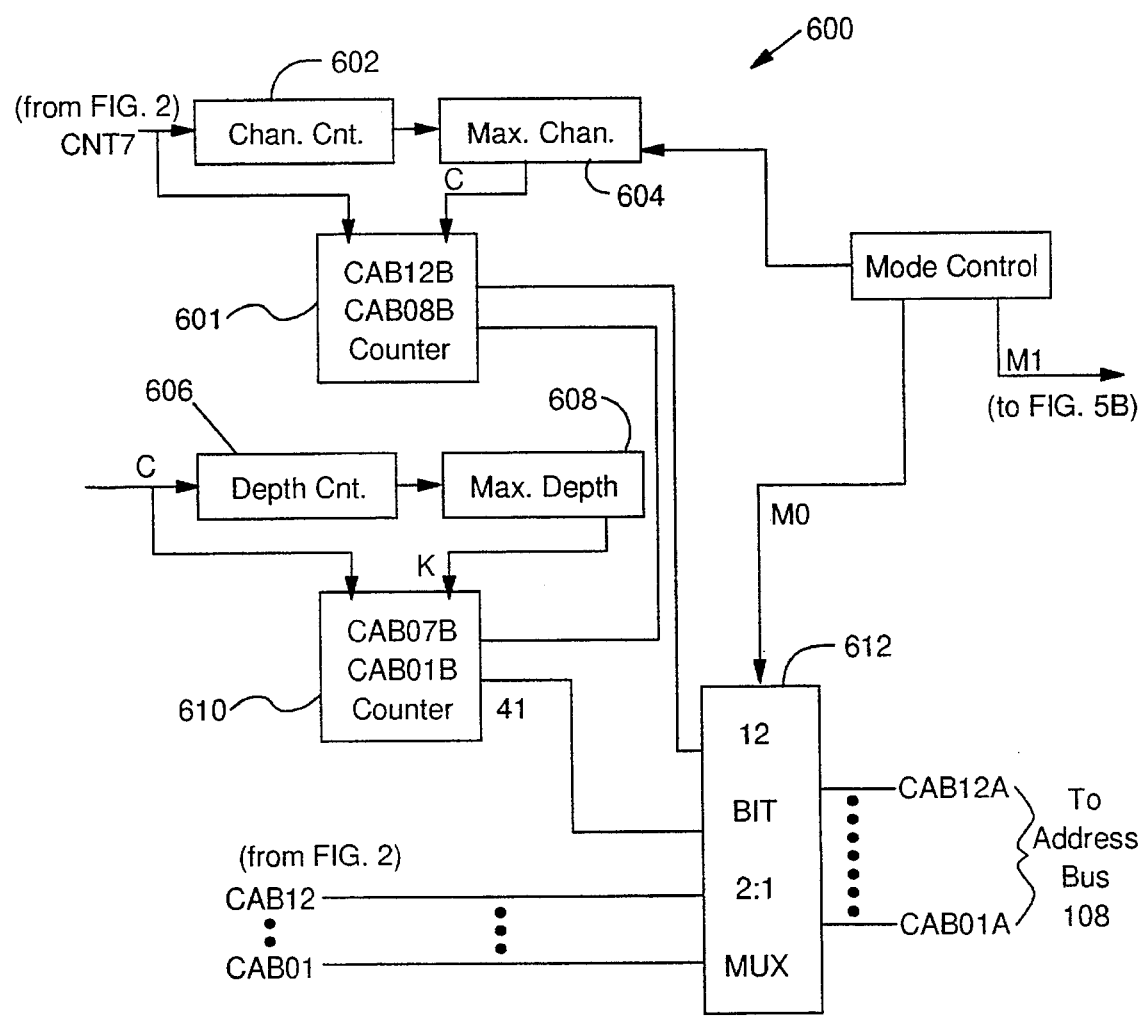
FIG. 6 shows channel buffering logic and address generation circuitry for the channelized mode of operation of the invention.

Using outputs CAB01–CAB12 of FIG. 2 is an option for address generation. FIG. 6 shows the channel buffering logic and address generation mechanism 600 for channelized mode of operation. The CAB12B–CAB08B counter is clocked by the signal CNT7 of FIG. 2 every 8 bits. The base address will change to a new value for that byte slot. At the end of the TDM frame defined by max channel counter 604, counter 601 is reset by signal C and depth counter 606 is clocked to next buffer depth count offset to CAB01B–CAB07B counter 610. Based on the maximum depth defined in bits 8–5 of mode control register 550 max depth counter 608 will generate reset signal K to the counter 610. Mode bit 0 (M0) selects which address generation logic is used for buffering the TDM data using Max 612 to output CAB01A–CAB12A to address bus 108.

The flexible buffering control method eliminates processing overhead associated with channelized operation of TDM links and reduces race conditions associated with programmed real time data movement.

It is believed that the operation and construction of the present invention will be apparent from the foregoing description and, while the invention shown and described herein has been characterized as a particular embodiment, changes and modifications may be made therein without departing from the spirit and scope of the invention as defined in the following claims.

What is claimed is:

1. A time division multiplexing interface circuit for interfacing between a serial data port and a data buffer, connected to a data bus and an address bus, said circuit comprising:

a first register having a first plurality of outputs, said first register for receiving a base address from said data bus and providing said base address at one or more of said first plurality of outputs, a plurality of most significant bits of said base address comprising a plurality of most significant bits of a first data buffer address;

a second register having a second plurality of outputs, said second register for receiving a control word on said data bus and providing a buffer size control word, a clock selection signal, a bit disable signal, an interleave signal and a modulo count signal at said second plurality of outputs;

a first N-bit counter for receiving a frame sync pulse and generating a reset signal once for every $2^N$ frames;

a clock timer for receiving a bit clock signal and generating a gated bit clock signal;

a bit counter for receiving said gated bit clock signal and generating a first clock signal and a second clock signal, said first clock signal toggling once per eight gated bit clock signals and, said second clock signal toggling once per sixteen gated bit clock signals;

a multiplexer for receiving said first and second clock signals and, said clock selection signal, said multiplexer selectively choosing between said first and second clock signals to provide a counter clock signal according to the state of said clock selection signal;

a second N-bit counter for generating a plurality of least significant bits of said first data buffer address, said second N-bit counter being clocked by said counter clock signal and receiving said bit disable signal, said modulo count signal, said interleave signal, and said reset signal, wherein said bit disable signal disables the least significant bit of said second N-bit counter when active, said modulo control signal selects modulo 24 or modulo 12 counting, said interleave signal determines whether odd or even addresses are used when interleaving buffers, and said reset signal resets said second N-bit counter when active; and a decoder for receiving said buffer size control word and disabling one or more bits of said second N-bit counter by forcing a parallel load for said one or more bits from one or more outputs of said first register.

2. The circuit of claim 1 further comprising:

a third register having a third plurality of outputs, said third register for receiving parallel data from said data bus and, providing said parallel data at said third plurality of outputs; and a fourth register having a serial data output, a plurality of parallel inputs and a tri-state control output, said third register for receiving said bit clock signal, said clock counter signal and parallel data at said plurality of parallel inputs, wherein said parallel data is loaded into said third register when said clock counter signal is active, said third register providing serial data clocked by said bit clock on said serial output.

3. The circuit of claim 2 further comprising:

an off-chip driver for receiving said tri-state control signal and said serial data and for switching said serial data to a serial output bus when said tri-state control signal is inactive, and decoupling said serial data signal from said serial output bus when said tri-state control signal is active.

4. The circuit of claim 1 further comprising:

a third register having a third plurality of outputs and a serial data input, said third register for receiving said bit clock signal and data from said serial data port at said serial data input, and providing parallel data at said third plurality of outputs; and a fourth register having a fourth plurality of outputs and a plurality of parallel inputs, said fourth register for receiving said clock counter signal, loading said parallel data when said clock counter signal is active, and providing said parallel data at said fourth plurality of outputs to said data bus.

5. The circuit in either of claims 2 or 4, said circuit further comprising:

a mode control register including a first mode control output providing a first mode control signal;

a third N-bit counter for receiving said second clock signal and generating a N-bit priority count;

a priority encoder for receiving said N-bit priority count and generating a active signal on one of a plurality of parallel outputs;

a slot enable register for receiving data from said data bus and generating a plurality of parallel outputs;

a plurality of logic gates each of said logic gates for receiving one output of said priority encoder and one output of said slot enable register and generating an output;

a logic gate having a plurality of inputs for receiving said outputs of said plurality of logic gates and generating a control signal;

a logic gate for receiving said data control signal and said first mode control signal and generating a data control signal when said first mode control signal is active; and a logic gate for receiving said clock selection signal and said data control signal, said first mode control signal enabling or disabling said clock selection signal to said multiplexer.

6. The circuit of claim 5 in which said mode control register further includes a second mode control output providing a second mode control signal and a plurality of outputs providing a N-bit maximum count signal, said circuit further comprising;

a fourth N-bit counter for receiving said second clock signal and said N-bit maximum count signal, said fourth counter generating a plurality of most significant bits of a second data buffer address and a maximum count signal said fourth N-bit counter being reset at a count equal to the value of said N-bit maximum count signal;

a fifth N-bit counter for receiving said maximum count signal and generating a plurality of least significant bits of said second data buffer address; and a N-bit multiplexer for receiving said first and second data buffer addresses and said second mode control signal, said N-bit multiplexer selectively choosing between said first and second data buffer addresses depending on the state of said second mode control signal to provide a data buffer address at said outputs.

7. A multi-mode system for interfacing with a serial data port comprising:

a bidirectional data bus;

a first address bus;

a random access memory for receiving a first address on said first address bus and outputting and receiving data on said bidirectional data bus according to said address;

a time division multiplexed interface circuit for receiving and transmitting data on said serial data port and, for receiving and transmitting data on said bidirectional data bus, said circuit providing a read request and a write request signal and a second address on a second address bus, wherein said circuit is selectively programmable by data received on said bidirectional data bus, to operate in a plurality of serial interface modes;

a digital signal processor for receiving said write and read request signals, said digital signal processor providing a select signal and a third address on a third address bus and outputting data and receiving data on said bidirectional data bus wherein data for selectively programming the time division multiplexed interface circuit includes data outputted from said digital signal processor; and a multiplexer for receiving said second and third addresses on said first and second address buses, and selectively choosing between said second and third addresses to provide said first address, depending on the state of said select signal.

8. A system for interfacing with a serial data port comprising:

a bidirectional data bus;

a first address bus;

a random access memory for receiving a first address on said first address bus and outputting and receiving data on said bidirectional data bus according to said address;

a time division multiplexed interface circuit for receiving and transmitting data on said serial data port and, for receiving and transmitting data on said bidirectional data bus, said circuit providing a read request and a write request signal and a second address on a second address bus, wherein said circuit is selectively programmable by data received on said bidirectional data bus, to operate in a plurality of serial interface modes including a plurality of multi-channel time division multiplexing modes, a serial input/output mode and a serial analog interface mode;

a digital signal processor for receiving said write and read request signals, said digital signal processor providing a select signal and a third address on a third address bus and outputting and receiving data on said bidirectional data bus; and a multiplexer for receiving said second and third addresses on said first and second data buses, and selectively choosing between said second and third addresses to provide said first address, depending on the state of said select signal.

9. The time division multiplex interface circuit of claim 1 further including a digital signal processor for controlling said time division multiplex interface circuit operatively coupled to the address bus and the data bus.

* * * * *